Figure 1:
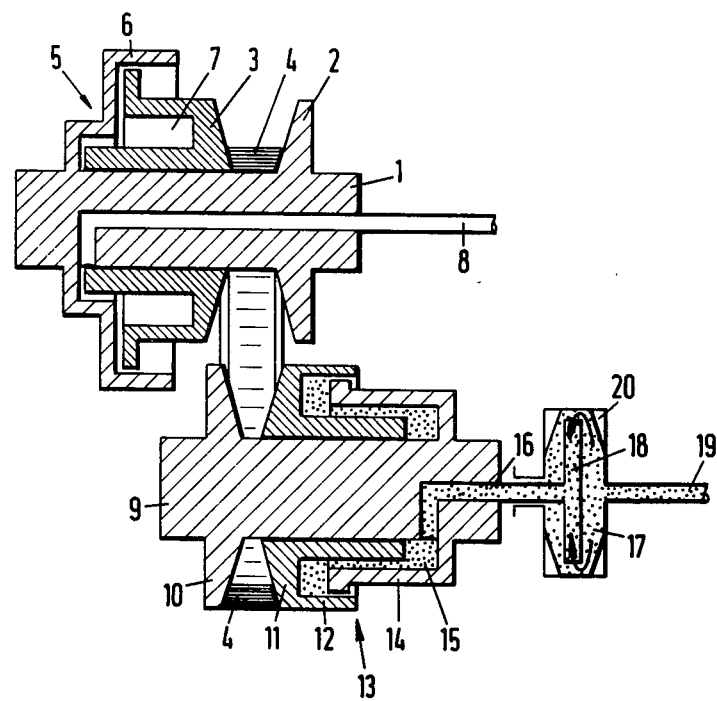

United States Patent

Ludoph et al.

[11] 4,056,015
[45] Nov. 1, 1977

[54] STEPLESS VARIABLE TRANSMISSION

[75] Inventors: Hemmo Hermannes Johannes Ludoph, Heeze; Petrus Henricus van Deursen, Deurne, both of Netherlands

[73] Assignee: van Doorne's Transmissie B.V., Tilburg, Netherlands

[21] Appl. No.: 685,419

[22] Filed: May 11, 1976

[51] Int. Cl.² .............................................. F16H 55/52
[52] U.S. Cl. ........................ 74/230.17 F; 74/230.17 F
[58] Field of Search .................. 74/230.17 F, 230.17 B

[56] References Cited

U.S. PATENT DOCUMENTS

| | | | |
|---|---|---|---|
| 2,993,385 | 7/1961 | Karig et al. | 74/230.17 F |
| 3,081,642 | 3/1963 | Emerson | 74/230.17 F |
| 3,395,586 | 8/1968 | Kirchner | 74/230.17 F |
| 3,600,961 | 8/1971 | Rattunde et al. | 74/230.17 F |

*Primary Examiner*—Edgar W. Geoghegan
*Attorney, Agent, or Firm*—Cushman, Darby & Cushman

[57] ABSTRACT

The fluid conduit of an hydraulic stepless variable transmission has a radial extension at its distal end terminating in a stationary chamber through which fluid is supplied to and discharged from a rotary piston-and-cylinder unit controlling the transmission.

The radial extension rotates within the chamber along with the piston-and-cylinder unit, and thereby acts to compensate for pressure build-up within the cylinder chamber resulting from the effect of centrifugal forces.

3 Claims, 2 Drawing Figures

STEPLESS VARIABLE TRANSMISSION

This invention relates to a hydromechanical torque converter, and concerns in particular certain improvements in or relating to a well-known kind of stepless variable transmission comprising an endless transmission member and at least one cone pulley, at least one conical disk of which is axially movable by means of an hydraulic piston-and-cylinder unit rotatable along with said disk, and a fluid conduit connected at one end to said piston-and-cylinder unit.

An example of such a prior infinitely variable transmission system is described in U.S. Pat. No. 3,600,961, which is incorporated herein by reference.

In such a transmission system, the transmission ratio is controlled by fluid supply or discharge to and from the piston-and-cylinder unit, whereby the relative distance of the conical disks of the respective pulley and hence the diameter of travel of the endless transmission member or drive belt is varied.

As the hydraulic piston-and-cylinder unit rotates along with the pulley centrifugal forces will occur, owing to which an hydraulic pressure will be built up within the cylinder, which pressure depends greatly upon the rate of rotation. This pressure increases the force which the conical disks exercise on the drive belt, which may be highly undesirable on account of the mechanical load on the drive belt or on account of its effect on the transmission ratio, depending on the type of control system used. Preferably the force exercised by the conical disks on the drive belt, the so-called pinching force, should only be dependent on the pressure of the liquid supplied and discharged through the fluid conduit.

It is an object of the present invention to provide a stepless variable belt transmission in which the pressure build-up in the hydraulic piston-and-cylinder unit owing to centrifugal forces is compensated.

According to the present invention, there is provided in a stepless variable transmission comprising an endless transmission member and at least one cone pulley having at least one conical disk axially movable by means of an hydraulic piston-and-cylinder unit rotating along with said disk, and a fluid conduit connected at one end to said piston-and-cylinder unit, the improvement that the fluid conduit terminates at its other end via a radially outwardly directed portion within a stationary chamber within which said portion can rotate along with the piston-and-cylinder unit, and via which chamber fluid is supplied to, and discharged from, said piston-and-cylinder unit.

By virtue of this construction, the fluid pressure in the fluid conduit is decreased depending on the rpm-value to compensate for the increase in pressure in the interior of the cylinder of the piston-and-cylinder unit resulting from centrifugal forces, which increase in pressure likewise depends on the rpm-value.

Fluid is supplied and discharged through the chamber in which a radial end portion of the fluid conduit rotates. The fluid within the chamber does not substantially rotate along with the radial end portion, so that even in the vicinity of the outlet of the fluid conduit the pressure within the chamber is substantially that with which the axial displacement of the conical disk is to be controlled. Depending on the rpm-value, this pressure is decreased in the end portion of the fluid conduit by the centrifugal force, so that the pressure within the substantially concentric part of the fluid conduit is lower than within the chamber.

Owing to the rotation of the space within the cylinder, this pressure is increased depending on the rpm-value, so that the total pressure acting on the conical disk can be controlled virtually independently of the rpm-value.

In order to minimize possible rotation of the fluid within the chamber, it is a further feature of the present invention that the radially outwardly directed portion of the fluid conduit is a substantially disk-shaped, concentrically rotatable member having one or a plurality of fluid conduit outlets formed in the radially outer surface thereof. Owing to this, the frictional resistance which the fluid encounters in the radial portion is minimized.

Furthermore, according to the invention, means for counteracting rotation of the fluid within the chamber may be fixed within the chamber.

One embodiment of the present invention will now be described, by way of example, with reference to the accompanying drawings.

Figure 2:
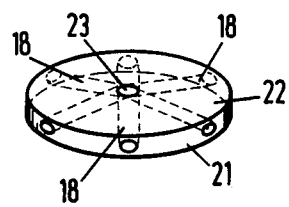

In said drawings,

FIG. 1 is a diagrammatic cross-section of a stepless variable belt transmission according to the present invention; and FIG. 2 shows a perspective diagrammatic view of the member comprising the radial conduit portion.

Referring to the drawings, in particular FIG. 1, there is shown a stepless variable belt transmission comprising a shaft 1 having a conical disk 2 formed thereon which together with a conical disk 3 axially movable over shaft 1 forms a cone pulley carrying a drive belt 4. Disk 3 is integrally connected to the piston member of a piston-and-cylinder unit 5, the cylinder member 6 of which is fixedly connected to shaft 1. As shown in FIG. 1, there is thus formed a cylinder chamber 7, to and from which, via a hydraulic fluid conduit 8, fluid can be supplied and discharged, respectively, whereby the relative distance between the conical disks 2 and 3 is varied.

Arranged in spaced parallel relationship with shaft 1 is a shaft 9 to which a conical disk 10 is fixedly secured, and over which a conical disk 11 can be axially displaced. Conical disks 10 and 11 form a second pulley over which drive belt 4 can run. Disk 11 is integrally connected to the cylinder member 12 of a piston-and-cylinder unit 13, the piston member 14 of which is fixedly connected to shaft 9. As shown in FIG. 1, there is thus formed a cylinder chamber 15 which, via conduit 16, is connected to means, not shown, for supplying and discharging hydraulic fluid.

By supplying fluid to, or discharging fluid from, cylinder chamber 7 and discharging fluid from, or supplying fluid to, cylinder chamber 15, respectively, the difference in rate of rotation between shafts 1 and 9 can be varied.

Owing to the fact that the piston-and-cylinder units 5 and 13 rotate along with the respective pulleys, an hydraulic pressure will be built up within each cylinder chamber 7, 15, depending on the rate of rotation, owing to the effect of centrifugal forces, so that the total pressure in cylinder chambers 7, 15 is greater than the pressure in conduits 8, 16, respectively. This additional pressure resulting from centrifugal forces increases quadratically with the rpm-value and may have a very adverse effect on the control of the transmission ratio and the control of the pinching force with which the conical disks 2,3; 10,11 are urged one towards the other.

A method of compensating for this additional pressure is illustrated in FIG. 1 for cylinder chamber 15.

Conduit 16, with which fluid is supplied to, and discharged from cylinder chamber 15 terminates in a chamber 17 which does not rotate along with shaft 9, and via which chamber 17 the fluid is supplied and discharged. In chamber 17, conduit 16 is provided with a radial portion 18 rotating along with shaft 9. The fluid pressure within chamber 17 is equal to the desired fluid pressure in cylinder chamber 15, and is controlled via conduit 19. In the rotating, radial conduit portion 18 the fluid pressure is decreased, so that the pressure prevailing in the portion of conduit 16 that is concentric with shaft 9 is lower than the desired pressure in cylinder chamber 15. This reduction in pressure compensates the additional pressure build-up resulting from the centrifugal forces in cylinder chamber 15, so that the pressure in conduit 19 is substantially equal to the average pressure in cylinder chamber 15.

Means for preventing rotation of the liquid in chamber 17, such as radial partitions 20, may be provided in chamber 17.

FIG. 2 shows an embodiment of a disk-shaped member 22 rotating within chamber 17 and having a plurality of radial ducts 18 terminating at the radially outer circumference 21 of disk 22. Conduit 16 is connected to aperture 23 of disk 22.

We claim:

1. In a stepless, variable transmission comprising an endless transmission member and at least one cone pulley having at least one conical disc axially movable by means of an hydraulic piston-and-cylinder unit rotating along with said disc, and a fluid conduit connected at one end to said piston-and-cylinder unit, said piston-and-cylinder unit including a rotatable shaft with said fluid conduit being located in said rotatable shaft, the improvement comprising said fluid conduit having at its other end a radially outwardly directed portion with respect to said shaft, said portion being located within a stationary chamber with the outlet of said portion in said stationary chamber being spaced a greater distance from said rotary shaft than the outlet of said one end of said fluid conduit in said shaft, said radially outwardly directed portion being rotatable along with said piston-and-cylinder unit in said stationary chamber through which chamber fluid is supplied to, and discharged from, said piston-and-cylinder unit.

2. Apparatus according to claim 1, wherein the radially outwardly directed portion of the fluid conduit comprises a substantially disk-shaped, concentrically rotatable member having at least one fluid conduit outlet in the radially outer surface thereof.

3. Apparatus according to claim 1, wherein said chamber comprises means fixed therein for minimizing rotation of hydraulic fluid within said chamber.

* * * * *